Oct. 19, 1954
D. W. MOORE, JR
HIGH-TEMPERATURE ELASTIC FLUID
TEMPERATURE MEASURING SYSTEM
Filed Sept. 8, 1948
2,691,890
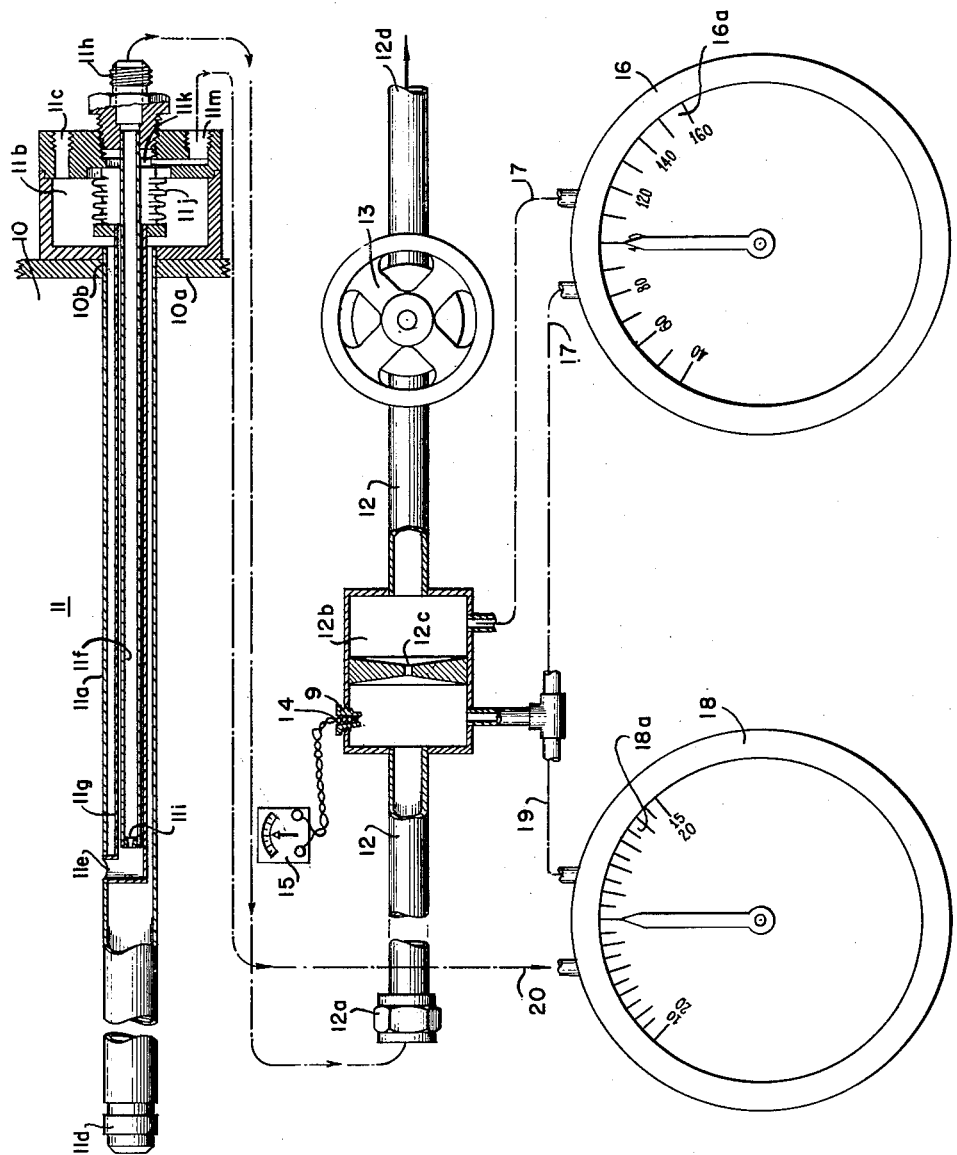
INVENTOR.
DAVID W. MOORE, Jr.
BY Laurence B Dodds
ATTORNEY Patented Oct. 19, 1954

2,691,890

UNITED STATES PATENT OFFICE 2,691,890

HIGH-TEMPERATURE ELASTIC FLUID TEMPERATURE MEASURING SYSTEM

David W. Moore, Jr., Pasadena, Calif., assignor to Fairchild Camera and Instrument Corporation, a corporation of Delaware Application September 8, 1948, Serial No. 48,276

5 Claims. (Cl. 73—357)

This invention relates to high-temperature elastic-fluid temperature-measuring systems and, while it is of general application, is particularly suitable for embodiment in a simplified portable apparatus for the measurement of the temperature of a high-temperature elastic fluid in any of a variety of apparatuses, such as internal-combustion gas turbines, industrial ovens, etc., in which the temperature of the gas is too high to be measured by conventional temperature-measuring devices.

In applicant's copending application Serial No. 604,367, filed July 13, 1945, now Patent 2,549,621, entitled "Elastic-Fluid Temperature-Responsive System," assigned to the same assignee as the present application, there is described and claimed a pneumatic temperature-responsive apparatus utilizing the basic principles of Boyle's law, in combination with Gay-Lussac's law or Charles' law, namely, that for any given mass of perfect gas the following equation is satisfied under all conditions of temperature and pressure:

$$PV = RT \qquad (1)$$

where $P$=absolute pressure of the gas
$V$=volume of the gas
$T$=temperature of the gas
$R$=the gas constant.

In the system of that application, a high-temperature fluid is passed through a cooling conduit having two spaced constrictions, one at the high-temperature end and the other at the low-temperature end. By measuring or regulating the parameters of fluid flow at the low-temperature constriction, it is shown that the temperature of the fluid at the high-temperature end is a measurable function of certain static pressures obtaining on either side of the constrictions.

The present invention represents a simplification of the pneumatic temperature-responsive apparatus described and claimed in aforesaid copending application which results in a compact, economical apparatus suitable for embodiment in a portable instrument.

It is an object of the present invention, therefore, to provide a new and improved high-temperature elastic-fluid temperature-measuring system, of the type described, of maximum simplicity and economy.

It is another object of the invention to provide a new and improved high-temperature elastic-fluid temperature-measuring system of the type described, which is sufficiently compact and light-weight for embodiment in portable apparatus suitable for measurement of the temperature of a high temperature elastic fluid in any of a variety of apparatuses utilizing such fluid.

In accordance with the invention, a system for measuring the temperature of a high-temperature elastic fluid in a container comprises a conduit adapted for fluid connection with said container, a first constriction in the conduit in the vicinity of its connection with the container and a second constriction in the conduit spaced from the first constriction. The conduit includes provisions for cooling the fluid flowing in the conduit in its passage between the two constrictions. The system also includes means for measuring the fluid temperature in the vicinity of the second constriction, means for adjusting the fluid differential pressure across the second constriction in accordance with variations of the measured temperature, and a differential pressure meter responsive to the fluid differential pressure across the first constriction and calibrated in terms of temperature thereat. By the term "container" as used herein and in the appended claims is meant any chamber, conduit, or the like, in which the high-temperature gas is confined or is flowing.

Further in accordance with the invention, in a system for measuring the temperature of a high-temperature elastic fluid in a container, there is provided a fluid-sampling probe comprising an elongated tubular housing having connections for passing a cooling fluid therethrough and an aperture in the wall thereof, and conduit means extending longitudinally within the housing and terminating at one end in a sealed connection with the aperture and at the other end in a fluid connection at one end of the housing. A constriction is disposed in the conduit means in the vicinity of the aperture and in the fluid flow path to such fluid connection and the conduit means includes a static-pressure transmitting conduit connected upstream of the constriction and terminating in a fluid connection at said one end of the housing.

For a better understanding of the present invention, together with other and further objects thereof, reference is had to the following description taken in connection with the accompanying drawing, and its scope will be pointed out in the appended claims.

The single figure of the drawing is a plan view, partly schematic, of a complete high-temperature elastic-fluid temperature-measuring system embodying the present invention. The system is applied to the measurement of the temperature of a high-temperature elastic fluid in a container 10, only a fragmentary portion of one wall 10a thereof being shown. The system includes a fluid-sampling probe 11 adapted to be inserted through an aperture 10b in the wall of the container. The probe 11 includes an elongated tubular housing 11a having connections for passing therethrough a cooling fluid, such as water. To this end, the housing 11a terminates at one end in an enlarged head 11b having a water inlet connection 11c. The other end of the housing 11a terminates in a fitting 11d comprising the other fluid connection. Water may be circulated between the outlet 11c and the fitting 11d in either direction, in any suitable manner. The housing 11a also has an aperture 11e in the wall thereof.

Within the housing 11a is disposed a conduit means extending longitudinally of the housing and terminating at one end in a sealed connection with the aperture 11e and thus in fluid connection with the fluid in the container 10. Specifically, the conduit means includes a conduit 11f which is disposed within a second coaxial conduit 11g, which is bent up at its end and sealed to the aperture 11e by welding, brazing, or the like. The other end of the conduit 11f terminates in a fluid connection at the end of the housing 11a, specifically, in a fitting 11h projecting from the end of the housing head 11b.

There is disposed in the conduit 11f in the vicinity of the aperture 11e, that is, in the vicinity of its connection with the container 10, a constriction or orifice 11i. The outer conduit 11g is in fluid connection to the upstream side of the orifice 11i and with conduit 11f forms an annular static-pressure transmitting conduit which terminates in a flexible, expansible section 11j within the head 11b to permit differential temperature expansion of the conduit 11g relative to the housing 11a. While both of these elements are water cooled, as described above, the housing 11a is much more intensely heated from the high-temperature fluid in container 10 than is conduit 11g and tends to operate at a higher average temperature. The expansible section 11j terminates in an annular chamber 11k connecting with an outlet 11m.

The temperature-measuring system also includes a conduit 12 adapted for fluid connection with the conduit portion 11f, for example, by means of a fitting 12a adapted to be connected to the fitting 11h, as indicated by the dot-dash line. The conduit 12 connects with an enlarged chamber 12b, in which is disposed a second orifice 12c which, by virtue of the length of the conduit 12, is considerably spaced from the constriction 11i. Normally, the conduit 12 is made of such a length as to secure the desired cooling of the fluid in its passage between the orifices 11i and 12c. This cooling may be supplemented by any conventional cooling means, in case the cooling effect of the walls of the conduit 12 is less than that desired.

The temperature-measuring system further includes means for measuring the fluid temperature in the vicinity of the constriction 12c. This means may be in the form of a thermometer well 9 inserted in the chamber 12b, in which is disposed a thermocouple 14 connected with a suitable temperature-indicating meter 15. The system further includes means for adjusting the fluid differential pressure across the constriction 12c in accordance with variations of the measured temperature at the orifice 12c, as indicated by the meter 15. Specifically, this means comprises a manually operable regulating valve 13 disposed in the conduit 12 downstream from the constriction 12c. The high-temperature gas extracted from the container 10 by the probe 11, after passage through the orifice 12c and valve 13, is discharged at the outlet 12d of the conduit 12.

To permit the operator properly to adjust the regulating valve 13, there is provided a differential-pressure indicator 16 of any suitable type, having fluid connections 17, 17 to the chamber 12b on opposite sides of the orifice 12c. The fluid connections 17 are preferably removable, flexible tubings to permit ready assembly and disassembly of the apparatus. As explained hereinafter, the differential pressure across the orifice 12c should be regulated to follow a predetermined function of the temperature indicated on the meter 15. To this end, the meter 16 is provided with a suitable scale 16a calibrated in terms of temperature, as indicated on the meter 15.

The temperature-measuring system also includes a differential-pressure meter 18 responsive to the fluid differential pressure across the orifice 11i. To this end, the meter 18 is provided with a fluid connection 19 to the chamber 12b on the upstream side of the orifice 12c, at which the static pressure is substantially the same as on the downstream side of the orifice 11i. It is further provided with a fluid connection 20 to the outlet 11m of the head 11b through which is transmitted the static pressure on the upstream side of the orifice 11i. The connections 19 and 20 are also preferably removable, flexible tubings. As explained hereinafter, the differential-pressure meter 18 may be provided with a scale 18a calibrated directly in terms of temperature of the elastic fluid at the high-temperature orifice 11i.

The operation of the above-described temperature-responsive apparatus of the invention may be best understood by considering certain fundamental relationships. As pointed out in the aforesaid copending application, the mass flow of an elastic-fluid flow through an orifice is represented by the equation:

$$W = C_1 A_1 \sqrt{\frac{(P_1-P_2)P_1}{T_1}} = C_2 A_2 \sqrt{\frac{(P_2-P_3)P_2}{T_2}} \quad (2)$$

where:

$W$ = fluid-mass flow
$A_1$ = effective area of orifice 11i
$A_2$ = effective area of orifice 12c
$P_1$ = high-side pressure at orifice 11i
$P_2$ = low-side pressure at orifice 11i
  = high-side pressure at orifice 12c
$P_3$ = low-side pressure at orifice 12c
$T_1$ = temperature of fluid at orifice 11i
$T_2$ = temperature of fluid at orifice 12c
$C_1$, $C_2$ = constants, including the gas constant R of the elastic fluid and the orifice constants of the orifices 11i and 12c, respectively.

By making orifices 11i and 12c of material having a low temperature-coefficient-of-expansion, such as tungsten, the areas of these orifices $A_1$ and $A_2$ are relatively constant over a wide temperature range. Then by adjusting the valve 13, the differential pressure across the orifice 12c can be maintained proportional to the temperature $T_2$ of the fluid at the orifice 12c, as indicated by the meter 15. This is done by calibrating the scale of the indicator 16 in terms of the temperature $T_2$, taking into consideration the characteristic of the orifice 12c and the gas constant of the fluid. Under these conditions, the ratio $T_2/(P_2-P_3)$ is maintained constant and Equation 2 becomes:

$$T_1 = k(P_1-P_2) \quad (3)$$

By properly calibrating the scale of the indicator 18, taking into account the characteristics of the orifices 11i and 12c and the gas constant, the indicator 18 may be made to indicate directly the temperature of the high-temperature fluid at the orifice 11i.

It is believed that the operation of the system of the invention will be apparent from the foregoing description. In brief, with the probe 11 inserted into the container 10 and with the pressure of the fluid in the container above the pressure at 12d, a small amount of the high-temperature fluid will be bled off by the probe 11 and will pass through the conduit portion 11f and the conduit 12, 12, thereby passing through the orifices 11i and 12c in series. The control valve 13 is then adjusted so that the indicator 16 indicates the temperature $T_2$ of the fluid at the orifice 12c, as determined by the reading of the meter 15. If the cooling provided by the elongated conduit 12 is sufficient so that its temperature at the orifice 12c is substantially ambient temperature, a temperature reading in air may be used in lieu of the thermocouple 14 and meter 15. As explained above, this operation maintains constant the factor $T_2/(P_2-P_3)$. Under these conditions, as shown mathematically above, the indicator 18 will indicate the actual temperature of the high-temperature elastic fluid at the orifice 11i.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for measuring the temperature of a high-temperature elastic fluid in a container comprising: a conduit adapted for fluid connection with said container; a first constriction in said conduit in the vicinity of its connection with said container; a second constriction in said conduit spaced from said first constriction; means including said conduit for cooling fluid flowing in said conduit in its passage between said constrictions; means for measuring the fluid temperature in the vicinity of said second constriction; means for adjusting the fluid differential pressure across said second constriction in accordance with variations of said measured temperature; and a differential-pressure meter responsive to the fluid differential pressure across said first constriction and calibrated in terms of temperature thereat.

2. A system for measuring the temperature of a high-temperature elastic fluid in a container comprising: a conduit adapted for fluid connection with said container; a first constriction in said conduit in the vicinity of its connection with the container; a second constriction in said conduit spaced from said first constriction; said conduit including an elongated portion between said constrictions for cooling the fluid in its passage therebetween; means for measuring the fluid temperature in the vicinity of said second constriction; means for adjusting the fluid differential pressure across said second constriction in accordance with variations of said measured temperature; and a differential-pressure meter responsive to the fluid differential pressure across said first constriction and calibrated in terms of temperature thereat.

3. A system for measuring the temperature of a high-temperature elastic fluid in a container comprising: a conduit adapted for fluid connection with said container; a first constriction in said conduit in the vicinity of its connection with the container; a second constriction in said conduit spaced from said first constriction; means including said conduit for cooling fluid flowing in said conduit in its passage between said constrictions; means for measuring the fluid temperature in the vicinity of said second constriction; a manually operable regulating valve in said conduit downstream from said second constriction for adjusting the fluid differential pressure across said second constriction in accordance with variations of said measured temperature; and a differential-pressure meter responsive to the fluid differential pressure across said first constriction and calibrated in terms of temperature thereat.

4. A system for measuring the temperature of a high-temperature elastic fluid in a container comprising: a conduit adapted for fluid connection with said container; a first member having an orifice in said conduit in the vicinity of its connection with the container; a second member having an orifice in said conduit spaced from said first orifice member; means including said conduit for cooling fluid flowing in said conduit in its passage between said orifices; means for measuring the fluid temperature in the vicinity of said second orifice; means for adjusting the fluid differential pressure across said second orifice in accordance with variations of said measured temperature; and a differential-pressure meter responsive to the fluid differential pressure across said first orifice and calibrated in terms of temperature thereat.

5. A system for measuring the temperature of a high-temperature elastic fluid in a container comprising: a fluid-sampling probe adapted for insertion in the container and including a conduit portion open to the fluid in the container; a conduit connected to said conduit portion; a first constriction in said conduit portion; a second constriction in said conduit spaced from said first constriction; means including said conduit for cooling fluid flowing in said conduit in its passage between said constrictions, said first constriction being so positioned in said conduit portion as to pass said high-temperature fluid before substantial cooling thereof; means for measuring the fluid temperature in the vicinity of said second constriction; means for adjusting the fluid differential pressure across said second constriction in accordance with variations of said measured temperature; and a differential-pressure meter responsive to the fluid differential pressure across said first constriction and calibrated in terms of temperature thereat.

References Cited in the file of this patent

UNITED STATES PATENTS

| Number | Name | Date |
| --- | --- | --- |
| 639,317 | Uehling et al. | Dec. 19, 1899 |
| 2,550,933 | McEvoy | May 1, 1951 |